Figure 1:
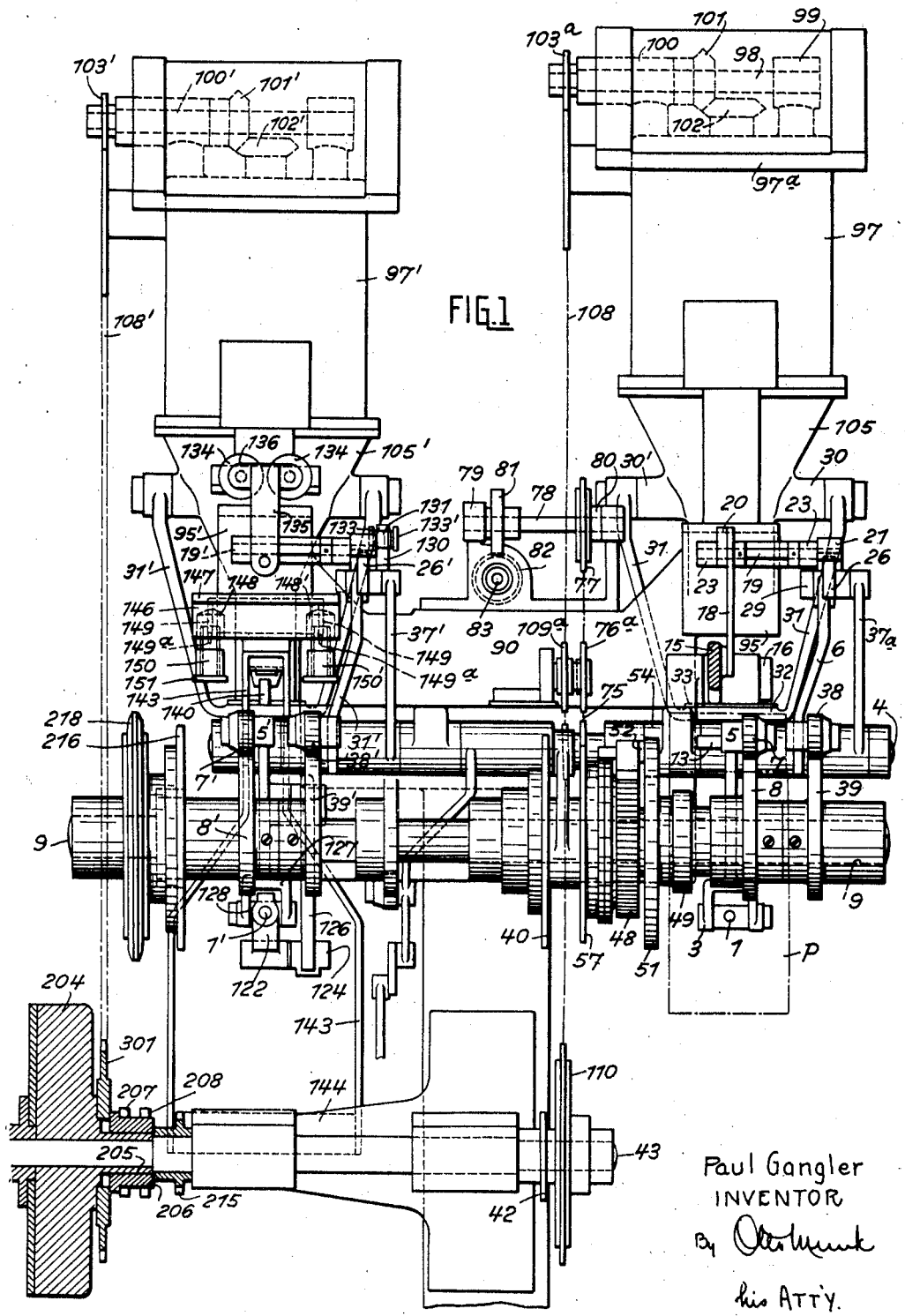

Sept. 30, 1930.  P. GANGLER  1,776,897
MEASURING DEVICE FOR FILLING MACHINES
Filed June 30, 1928  4 Sheets-Sheet 1

Paul Gangler
INVENTOR

By Otto Munk
his ATTY.

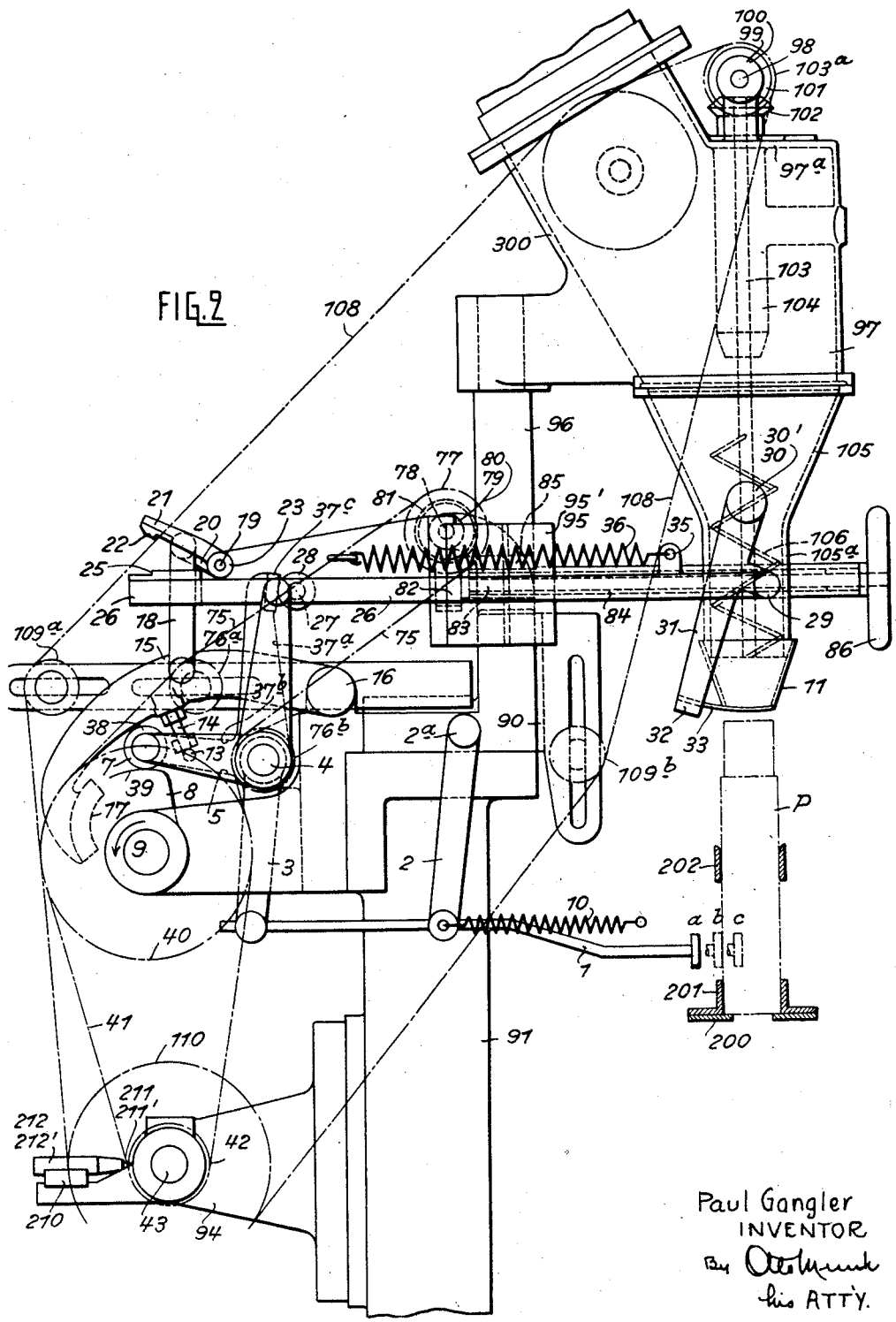

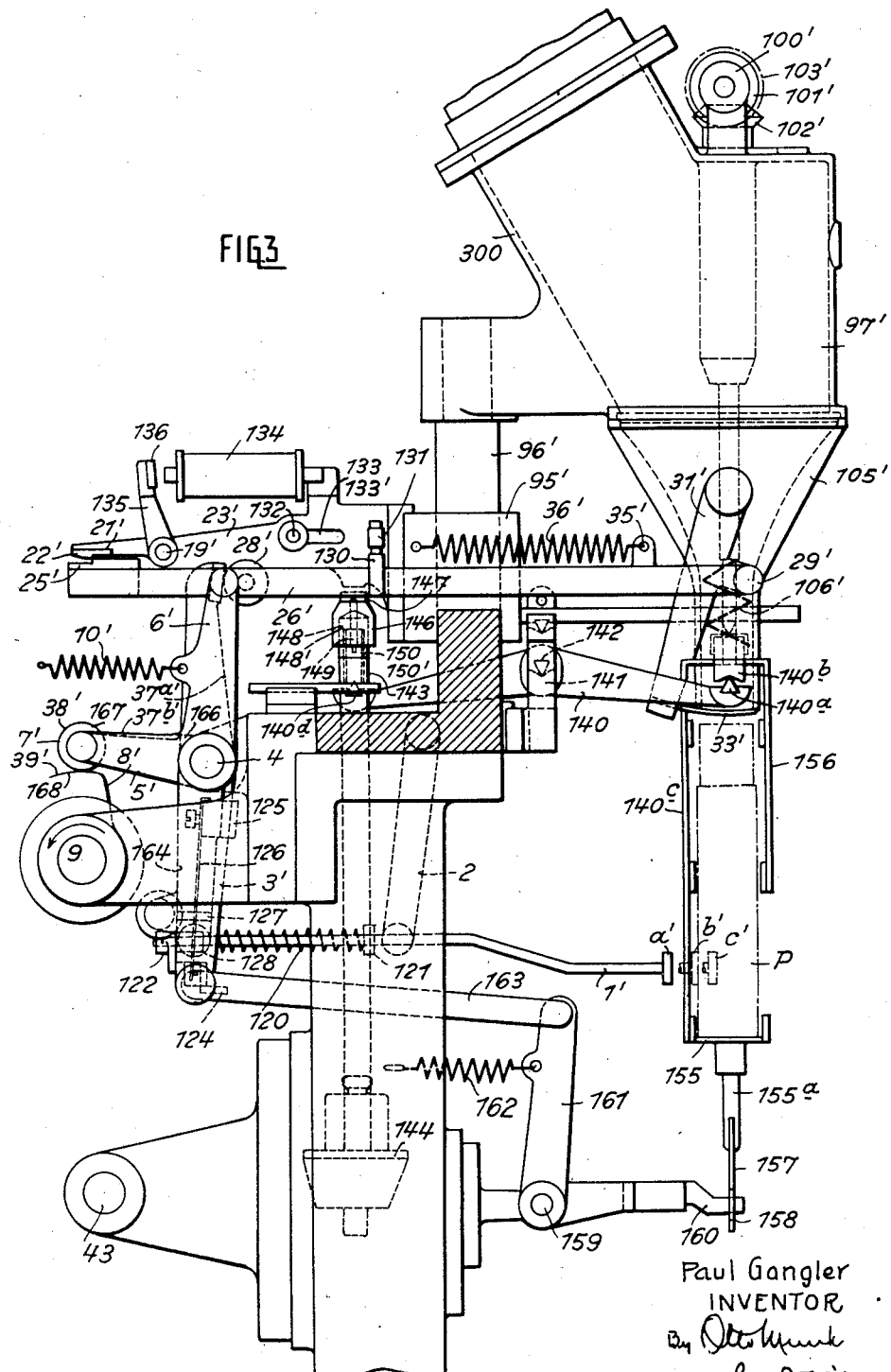

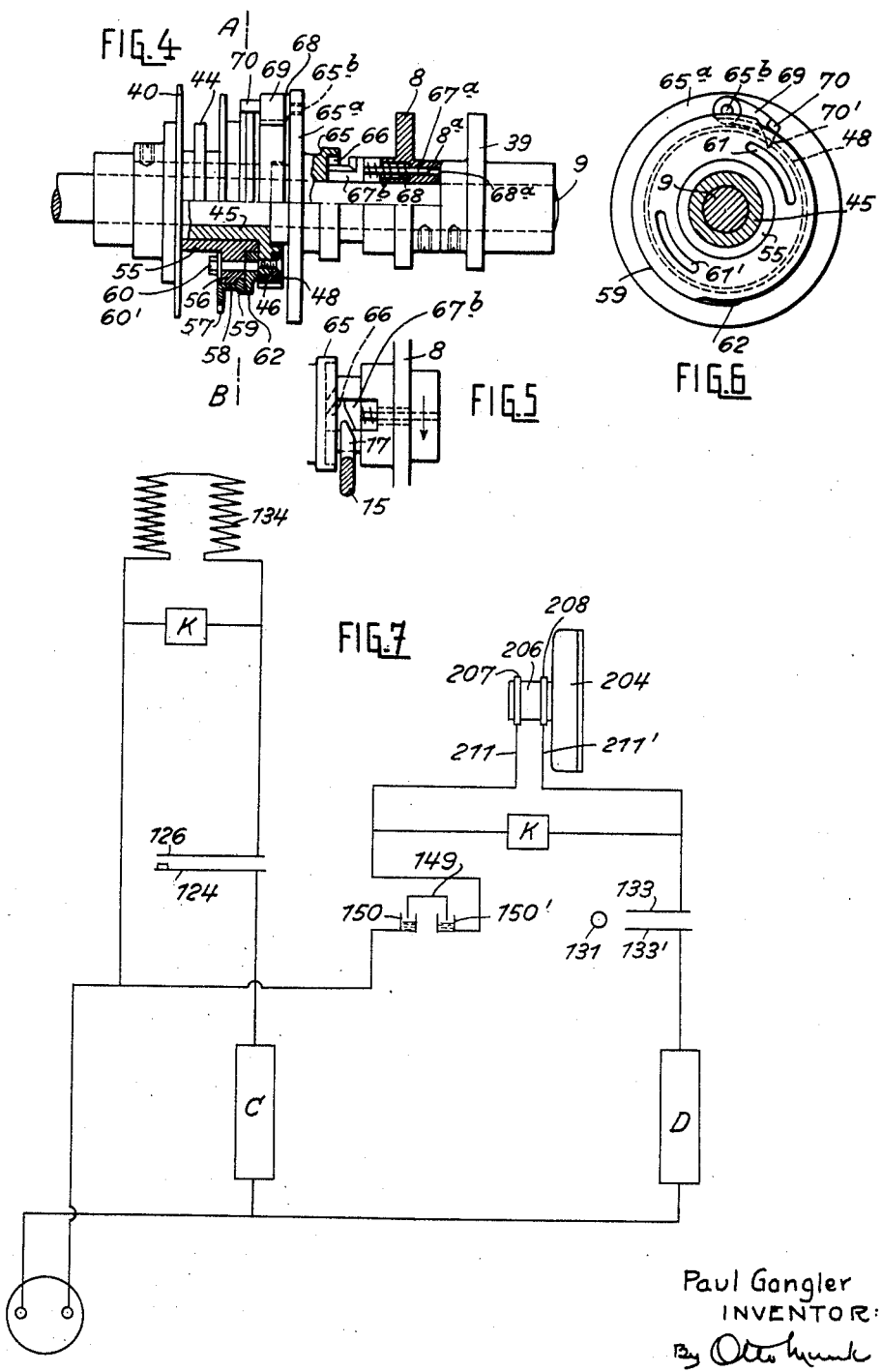

Patented Sept. 30, 1930

1,776,897

UNITED STATES PATENT OFFICE

PAUL GANGLER, OF ESSLINGEN, GERMANY, ASSIGNOR TO THE FIRM FR. HESSER, MASCHINENFABRIK-AKTIENGESELLSCHAFT, OF STUTTGART-CANNSTATT, GERMANY

MEASURING DEVICE FOR FILLING MACHINES

Application filed June 30, 1928, Serial No. 289,350, and in Germany July 7, 1927.

The invention relates to a measuring device for filling machines, which combines simplicity of construction with accurate preliminary dosage and final dosage with weighing and which may be regulated during the operation of the machine in a very simple manner.

An embodiment of the invention is illustrated in the drawings affixed hereto and forming part of the specification.

In the drawings is

Fig. 1, a side-elevation of the complete device,

Fig. 2, a side-elevation of the preliminary dosing device,

Fig. 3, a side-elevation of the final dosing device,

Fig. 4, a side-elevation, partly in section, of the driving mechanism,

Fig. 5, a plan of a part of Fig. 4,

Fig. 6, a cross-section along line A—B of Fig. 4, and

Fig. 7, a connection diagram for the final dosing device.

Like numerals indicate like parts in the various figures of the drawings.

In the design of the device illustrated by way of example, the packages P to be filled are intermittently fed forward on a track 200 between guide angles 201 and guide rails 202 by means of a feeding device of any construction well known in the present art. At the station, where the preliminary filling or dosing takes place, there is provided a feeler 1 adapted to be moved towards the package 1. This feeler is pivotally mounted by means of the lever 2 pivoted at 2ª and by means of the bell-crank lever 3, 5 on the bolt 4. The arm 5 is kept in engagement with a cam 8 keyed to the shaft 9 by means of a spring 10 and the anti-friction bowl 7, see more particularly Fig. 1. The shaft 9 is continuously rotated by a suitable driving shaft not shown.

On the arm 5 is mounted a carrier pin 13 upon which rests by means of the adjusting screw 14 a trap 15 which is pivoted at one end at 16 on the machine frame and provided at the other end with a curved tooth 17, see also Fig. 5. With the trap 15 is connected by means of the link 18 a lever 20 secured to the bolt 19. To the other end of said bolt is secured a locking trap 21 with a nose 22. The bolt 19 is journaled in the eyes 23, Fig. 1. The nose 22 is adapted to engage a rest 25 mounted on a push-rod 26 which is slidably mounted in the machine framing. The rod 26 is kept in engagement with the flattened end 37ᶜ of a bell-crank lever 37ª, 37ᵇ with a bowl 28 mounted on a pin 27 of the push-rod by means of a tension spring 36 engaging the eye 35. The arm 37ᵇ thus remains in engagement with a tappet 39 of the shaft 9 by means of a bowl 38, see in particular Fig. 1.

At the front end of the push-rod 26, there is hinged a bow-shaped lever 31 at 29 on the extensions 30, 30′ of the inlet funnel 105, and on the web 32 of the lever is mounted the stop slide 33. In the neck 105ª of the filling funnel provided with the inlet nozzle 11 is adapted to rotate a conveyor worm 106. This worm is mounted on a shaft 103 journaled in a bushing 104 of the inlet cylinder 97 and provided at its outer extremity with a bevel wheel 102 meshing with a bevel wheel 101 which is keyed to the shaft 98 journaled in bearings 99, 100 of the cylinder cover 97ª. The shaft 98 is driven by means of a sprocket wheel 103ª and chain 108 passing over guide wheels 109ª and 109ᵇ and the sprocket wheel 110 of the counter-shaft 43.

The sprocket wheel 42 of the countershaft 43 is driven by means of a chain 41 from a sprocket wheel 40, which, as Fig. 4 shows, is rigidly mounted on a bushing 45, which in its turn is journaled on the shaft 9, but is adapted to be coupled with it. The bushing 45 is provided with a flange 46 and feed wheel 48 secured upon it and is journaled in a bearing 55 on the flange 56 of which a sprocket wheel 57 is rotatable in the groove 58. The sprocket wheel 57 is designed with a suitable running face 59, Figs. 4 and 6, to act as a tappet. An annular eccentric 62 which is adjustably secured in relation to said tappet by means of screws 60, 60′ in slots 61, 61′, holds the sprocket wheel 57 on the flange 58 of the bearing 55. From the sprocket wheel 57 the chain 75 passes over tension wheels 76ª, 76ᵇ to a sprocket wheel 77, which is keyed on a shaft 78 journaled in the bearings 79 and 80 of the machine framing. On the shaft 78 is keyed a worm wheel 81 gearing with a worm wheel 82. The latter is mounted on the spindle 83 provided with a hand wheel 86 and journaled in a tube 84. This tube is rigidly held in a bearing 85, which is mounted on a bracket 90 of the pillar 91. On the pillar 91 is also fixed the bearing 94 of the shaft 43.

On the shaft 9 there is also rotatable a coupling bushing 65 with a tooth-shaped recess or notch 66. It carries on the flange 65$^a$ a bolt 65$^b$ upon which is fulcrumed a trap 69. This trap rests with a tappet 70 upon the eccentrics 59, 62 and is able to engage with the tooth 70' the teeth of the ratchet wheel 48, for the purpose of entraining the bushing 45, when the eccentrics set the tappet 70 free. Adjacent to the coupling bushing 65 there is mounted on the shaft 9 the tappet 8 already mentioned, by means of the hub 8$^a$. In a bore 68$^a$ of this hub there is journaled the shaft 67$^a$ of a coupling latch 67$^b$, which by a spring 68 is forced outwards into the recess 60 of the coupling bushing or sleeve 65.

The bracket 90 is provided with arms 95, 95' in which the bolts 96—96' are adjustably mounted. These bolts carry the dosing cylinders 97 and 97', the latter of which forms part of the final dosing mechanism described farther on. Each dosing cylinder is equipped with an inlet branch 300. The mode of operation of the preliminary dosing device described is as follows:

Should no package P have been passed underneath the nozzle 11 of the preliminary dosing cylinder 97, the feeler 1 will, when the tappet 8 of the continuously revolving shaft 9 releases the roller 7, be moved by the spring 10 from the position $a$, in which up to then it was maintained by the tappet 8, into the position $c$ of Fig. 2 indicated by broken lines. Owing to the descent of the arm 5, the catch 15 resting on the pin 13 drops off and draws by means of the link 18 the pawl 21 along, so that its nose 22 engages the back of the stop 25 of the pushrod 26. If now the bowl 38 of the arm 37$^b$ is set free during the rotation of the shaft 9 by its tappet 39 and consequently also the bowl 28 of the pushrod 26 by the arm 37$^a$, the spring 36 cannot withdraw the pushrod 26 towards the left in Fig. 2, i. e. the stop slide 33 coupled with the push rod 26 by means of the link 29 and the fork 31 is obliged to remain in its closing position, so that it keeps the nozzle 11 closed when no package is underneath it.

During the dropping of the lever 15, its curved latch-shaped member 17, Fig. 5, has dropped on the latch 67$^b$ and has forced it back into its inoperative position, i. e. the coupling effected by this latch between the shaft 9 and the coupling bushing 65 is interrupted, so that the conveyor worm 106 remains stationary.

If, on the other hand, a package P is passed under the nozzle 11, the feeler 1 can be moved only into the position $b$ indicated in dotted lines in Fig. 2, when the arm 5 is released. The trap 21 as well as the curved member 17 thus do not come into engagement with the rest 25 of the pushrod 26 and the latch 67$^b$ of the tappet hub 8$^a$ keyed to the shaft 9, respectively. If now the arm 37$^b$ of the tappet 39 and thus the roller 28 is set free by the arm 37$^a$, the spring 36 is able to move the push-rod 26 towards the left, Fig. 2, and the stop slide 33 is consequently opened, so that a certain stream of material, determined by the rotation of the worm conveyor 106, will flow from the funnel 105 into the package P. This rotation of the worm 106 is determined by the rate of rotation which is imparted to the sprocket wheel 40 serving for the drive of the worm 106, by means of the bushing 65, the ratchet pawl 69 and the ratchet wheel 48. Since the duration of rotation of the ratchet wheel 48 depends on the section of the circumference of the eccentric 59, 65 upon which the nose 70 of the ratchet pawl 70' is kept out of engagement with the ratchet wheel 48, it is thus possible by suitable adjustment of the tappet 59 in relation to the tappet 62, which may by means of the handwheel 86 and the described chain transmission be carried out during the operation of the machine, to change the rate of rotation of the worm conveyor 106 and thus the quantity of material filled into the package during the preliminary dosage.

At the filling up or final dosing device, the feeler 1' is adapted to swing in the same manner as in the preliminary dosing device, by means of the link 2' and the bell-crank lever 3', 5', the arm 5' with the bowl 7' being pulled against a tappet 8' mounted on the shaft 9 by a spring 10' engaging the arm 6'. The opening and closing of the stop slide 33' likewise takes place by means of a forked lever 31' pivotally suspended at the inlet funnel 105', said lever being hinged to the pushrod 26' at 29', which by the spring 36' is pulled with its bowl 28' against a bell-crank lever 37$^{a'}$, 37$^{b'}$. The anti-friction bowl 38' of the latter arm is hereby forced against a tappet 39' keyed to the shaft 9.

The drive of the final dosing worm 106' is effected in a similar manner as in the case of the preliminary dosing by means of bevel wheels 102', 101, shaft 100' and chain wheel 103' by chain 108' from the sprocket wheel 301 mounted on the countershaft 43.

The weighing mechanism consists of a scale beam 140 supported by the knife edge 142 in the notch 141, on the knife edge 140$^a$ of which by means of the notch 140$^b$ and the hoop 140$^c$ is suspended the load bowl 155 replacing at the final dosing place the guide track for the packages. This bowl 155 carries on a pin 155$^a$ secured to it, a lower extension 157 with slot 158 engaged by a lever 160 pivoted at 159. With this lever is rigidly connected a vertical arm 161 controlled by a spring 162 and connected by a link 163 with the arm 164 of a bell-crank lever rotatably mounted on the shaft 4, the other arm 166 of said bell-crank lever being held by means of said spring 162 with an anti-friction bowl 167 against the circumference of a tappet, which is indicated at 168, of the shaft 9.

At the other arm of the beam 140, there is suspended by means of the knife edge 140ᵈ a hoop 143 carrying the weight bowl 144.

In the final dosing device described the prevention of the filling, when no package is present, is effected by electric means.

For this purpose, there is mounted on the extremity of the feeler rod 1' an angle piece 122 and on it insulated a further angle 124 for connecting the electric line and adapted to cooperate with a contact spring 126 insulated upon the arm 3', see in particular Fig. 7. The arm 3' pivotally engages with its lower forked end 127 a link block 128, in which the feeler rod 1' is adapted to slide. Between the said block 128 and a collar 121 fixed upon the rod 1' there is located a spring 120.

On the pushrod 26' there is mounted a supporting member 130 with contact roller 131, while upon the bracket 23' there are fixed by means of bolts 132 two contact springs 133, 133' serving as line terminals and insulated from each other as well as from the bolt 132, see in particular Fig. 7. Upon the bracket 23' there is furthermore mounted a twin electromagnet 134 of known construction, the armature 136 of which is mounted on an arm 135 keyed to the shaft 19'. On the shaft 19' is mounted the pawl 21' provided with the nose 22' adapted to engage the step 25' of the push-rod 26'.

The sprocket 301 is rigidly connected with an electric clutch 204 of any well-known kind. This clutch carries on its hublike extension 205 a sleeve 206 of insulating material with two slip-rings 207, 208 for transmitting current from two resilient contact members 211, 211', see Figs. 2 and 7, which are seated in holders 212, 212' mounted on the bearing by means of the rail 210.

There is also mounted on a transverse beam 145 of the bow or rigging 143 an insulating member 146 provided with a cover 147, and in which is accommodated a conductor 149, which with its free extremities 149ᵃ dips into mercury cups 150, 150' fixed on the machine frame, see Fig. 7, in which C and D are resistances and K condencers. In the insulating member 146 there are furthermore provided cavities 148, 148' above the mercury cups 150, 150', so that the insulator 146 simultaneously serves as a protective hood for the mercury cups 150, 150'.

The mode of operation is as follows:

If a package is on the scale 155, the feeler 1' can only be moved into the position $b^1$, when the bowl 7' is released from the tappet 8' of the shaft 9 and the arm 6' is consequently moved towards the left by the spring 10' and the arm 3' towards the right, where its motion is limited by coming in contact with the package P. Since, however, the arm 3' continues to move under the action of the spring 10', it displaces the link block 128 along the rod 1', while compressing the spring 120, so that the contact spring 126 mounted on the said arm 3' comes in electric contact with the contact 124 of the rod 1' and thus closes the circuit of the electromagnet 134. The armature 136 is consequently attracted and the pawl 22' is moved out of the range of the shoulder 25', so that when the bowl 38' of the bell-crank lever 37ᵃ' is set free by its tappet 39', the push-rod 26' is moved by the spring 36' towards the left and the stop slide 33' is opened. During the displacement of the rod 26', the contact roller 131 has passed between the contact springs 133, 133' and has thus closed the circuit for the electric coupling 204, whereby the sprocket wheel 301 is rotated and the weighing worm 106' is set in operation by means of the chain 108' and the sprocket wheel 103', so that the material to be packed will flow from the funnel 105' into the package located underneath the funnel. The scale 155 is held stationary for a short time by means of the arm 160, controlled by the system of links 161, 163, 164, 166 from the bowl 167 and the tappet 168 of the shaft 9, in order not to disturb the scale during the flowing in of the material, but then it is suddenly released by the tappet 168. Package and scale descend slowly, until the electric conductor 149 located at the other end of the beam 140 on the rigging 143 of the scale 144, is lifted out of the mercury cups 150, 150', into which it was immersing up to then, and thus again interrupts the circuit for the clutch 204. In this way, the worm 106' is stopped and the weighing operation finished. Before the further feed of the package, the arm 3' and the feeler 1' are withdrawn by means of the tappet 8' and the bowl 7', and the rod 26' is pushed back by means of the tappet 39' and the bowl 38' into the position shown, whereby the outlet opening of the funnel 105' is closed again. During the withdrawal of the arm 3', the contact 126, 124 and thus the circuit of the electromagnet 134 has been broken, so that the armature 136 is released and the pawl 22' drops again into the path of the shoulder 25'.

If, on the other hand, there is no package P on the scale 155 and the feeler 1' is now moved towards the right by the mechanism described, it is able to take up the outer position indicated by the reference letter $c'$, i. e. no contact is made between the contact spring 126 of the arm 3' and the contact 124 of the feeler 1', so that the circuit of the magnet 134 is not closed and the pawl 21' remains in the locking position for the shoulder 25'. The rod 26' can, therefore, not be pulled back by the spring 36', i. e. the inlet funnel 105' is neither opened nor are the contacts 131 and 133, 133' closed, so that the conveyor worm 106' is not started.

Various changes may be made without departing from the spirit of my invention.

I claim as my invention:

1. In a measuring device with conveyor dosing mechanism for filling and the like machines, in combination, a storage funnel, closing means for the storage funnel, means for operating said closing means, a conveyor means for operating said conveyor means, means for feeding automatically packages upon the filling station, a feeler member controlling the operation of said conveyor means and closing means, and means for resiliently reciprocating said feeler member towards and away from said filling station synchronously with the automatic supply of packages thereto.

2. In a measuring device with conveyor closing mechanism for filling and the like machines, in combination, a storage funnel, closing means for the storage funnel, means for operating said closing means a locking device for said closing means, means for feeding automatically packages upon the filling station, a feeler member for controlling the operation of said closing means in such a manner that said closing means remain closed when there is no package on the filling station, and means for resiliently reciprocating said feeler member towards and away from said filling station synchronously with the automatic supply of packages thereto.

3. In a measuring device with conveyor dosing mechanism for filling and the like machines, in combination, a storage funnel, closing means for the storage funnel, means for operating said closing means, means for driving said conveyor means, a conveyor means for feeding automatically packages upon the filling station, a clutch located between the driving shaft and the driving means for said conveyor means, a feeler member adapted to control the operation of said clutch, so that said conveyor remains inoperative when there is no package on the filling station, and means for resiliently reciprocating said feeler member towards and away from said filling station synchronously with the automatic supply of packages thereto.

4. In a measuring device with conveyor dosing mechanism for filling and the like machines, in combination, a storage funnel, closing means for the storage funnel, a rod for operating said closing means, a trap for locking said rod in the closing position, a conveyor means for operating said conveyor, a member adapted to be yieldingly reciprocated towards the filling station and a system of levers to operate said trap.

5. In a measuring device with conveyor dosing mechanism for filling and the like machines, in combination, a storage funnel, closing means for the storage funnel, a rod for operating said closing means, a trap for locking said rod in the closing position, a conveyor means for operating said conveyor, a member adapted to be yieldingly reciprocated towards the filling station and an electromagnet to operate said trap.

6. In a measuring device with conveyor dosing mechanism for filling and the like machines, in combination, a storage funnel, closing means for the storage funnel, a rod for operating said closing means, a trap for locking said rod in the closing position, a conveyor means for operating said conveyor, a member adapted to be yieldingly reciprocated towards the filling station and to operate said trap, a tappet on the driving shaft, a lever controlled by said tappet, a spring adapted to pull said rod against said lever, a pawl adapted to be operated by a lever controlled by a tappet on the main driving shaft and to effect the reciprocation of said member in regard to the filling station, the latter lever being adapted to be first released by its tappet and only then the former lever.

7. In a measuring device with conveyor dosing mechanism for filling and the like machines, in combination, a storage funnel, closing means for the storage funnel, means for operating said closing means, a conveyor means for driving said conveyor means, and a member adapted to be yieldingly reciprocated towards the filling station, a claw coupling located between the driving shaft and the driving means for said conveyor, and a drop pawl for disengaging said coupling adapted to be operated by said member.

8. In a measuring device with conveyor dosing mechanism for filling and the like machines, in combination, a storage funnel, closing means for the storage funnel, means for operating said closing means, a conveyor means for driving said conveyor means, and a member adapted to be yieldingly reciprocated towards the filling station, a claw coupling located between the driving shaft and the driving means for said conveyor, and a drop pawl for disengaging said coupling adapted to be controlled by the lever effecting the reciprocation of said member.

9. In a measuring device with conveyor dosing mechanism for filling and the like machines, in combination, a storage funnel, closing means for the storage funnel, means for operating said closing means, a conveyor means for driving said conveyor means, and a member adapted to be yieldingly reciprocated towards the filling station, a claw coupling located between the driving shaft and the driving means for said conveyor, and a drop pawl for disengaging said coupling, a locking tooth axially slidable on a fixed bushing of the driving shaft adapted to be controlled by said drop pawl, a loose bushing on the driving shaft provided with a locking face and adapted to effect the rotation of the driving wheel of said conveyor and a spring adapted to keep said locking tooth in engagement with said locking face.

10. In a measuring device with a conveyor dosing mechanism for filling and the like machines, in combination, a storage funnel, closing means for the storage funnel, means for operating said closing means, a conveyor means for driving said conveyor means, and a member adapted to be yieldingly reciprocated towards the filling station, a claw coupling located between the driving shaft and the driving means for said conveyor, and a drop pawl for disengaging said coupling, a locking tooth axially slidable on a fixed bushing of the driving shaft adapted to be controlled by said drop pawl, a loose bushing on the driving shaft provided with a locking face and adapted to effect the rotation of the driving wheel of said conveyor, and a spring adapted to keep said locking tooth in engagement with said locking face, a loose bushing on the driving shaft upon which said conveyor driving wheel is mounted, a ratchet pawl on the coupling sleeve, and a ratchet wheel fixed on the said bushing adapted in cooperation to turn said bushing, said pawl being adapted to be kept out of engagement with said ratchet wheel on a part of its circle of rotation.

11. In a measuring device with conveyor dosing mechanism for filling and the like machines, in combination, a storage funnel, closing means for the storage funnel, means for operating said closing means, a conveyor means for driving said conveyor means, and a member adapted to be yieldingly reciprocated towards the filling station, a claw coupling located between the driving shaft and the driving means for said conveyor, and a drop pawl for disengaging said coupling, a locking tooth axially slidable on a fixed bushing of the driving shaft adapted to be controlled by said drop pawl, a loose bushing on the driving shaft provided with a locking face and adapted to effect the rotation of the driving wheel of said conveyor, and a spring adapted to keep said locking tooth in engagement with said locking face, a loose bushing on the driving shaft upon which said conveyor driving wheel is mounted, a ratchet pawl on the coupling sleeve, and a ratchet wheel fixed on the said bushing adapted in cooperation to turn said bushing, said pawl being adapted to be lifted out of engagement with its ratchet wheel by a tappet the operative length of which is adapted to be adjusted.

12. In a measuring device with conveyor dosing mechanism for filling and the like machines, in combination, a storage funnel, closing means for the storage funnel, means for operating said closing means, means for driving said conveyor means, and a member adapted to be yieldingly reciprocated towards the filling station, a claw coupling located between the driving shaft and the driving means for said conveyor, and a drop pawl for disengaging said coupling, a locking tooth axially slideable on a fixed bushing of the driving shaft adapted to be controlled by said drop pawl, a loose bushing on the driving shaft provided with a locking face and adapted to effect the rotation of the driving wheel of said conveyor, and a spring adapted to keep said locking tooth in engagement with said locking face, a loose bushing on the driving shaft upon which said conveyor driving wheel is mounted, a ratchet pawl on the coupling sleeve, and a ratchet wheel fixed on the said bushing adapted in cooperation to turn said bushing, said pawl being adapted to be lifted out of engagement with its ratchet wheel by a tappet with two cam faces, and a self-locking gearing for adjusting one of said cam faces in relation to the other.

13. In a measuring device with conveyor dosing mechanism for filling and the like machines, in combination, a storage funnel, closing means for the storage funnel, a rod for operating said closing means, a trap for locking said rod in the closing position, a conveyor means for operating said conveyor, a member adapted to be yieldingly reciprocated towards the filling station and to operate said trap by means of an electromagnet, the circuit of said magnet being adapted to be closed by a contact on said member and a contact on the lever for reciprocating said member, said lever being adapted to perform a relative motion in relation to said member against the resistance of a spring, so that when said member encounters a package, the contact is closed owing to the arrest of said member and the continuation of the motion of said lever, while the contact remains open, when no package is present.

14. In a measuring device with conveyor dosing mechanism for filling and the like machines, in combination, a storage funnel, closing means for the storage funnel, means for operating said closing means, a conveyor means for driving said conveyor means, and a member adapted to be yieldingly reciprocated towards the filling station, and a clutch located between the driving shaft and the driving means for said conveyor means adapted to be controlled by said member, so that said conveyor remains inoperative when there is no package below the outlet of said storage funnel, and an electro-magnetic coupling for throwing into engagement the driving wheel for said measuring conveyor, the connecting contacts of said coupling being open when said closing means is locked, but are closed when the closing means is opened.

15. In a measuring device with conveyor dosing mechanism for filling and the like machines, in combination, a storage funnel, closing means for the storage funnel, means for operating said closing means, a conveyor means for driving said conveyor means, and a member adapted to be yieldingly reciprocated towards the filling station, and a clutch located between the driving shaft and the driving means for said conveyor means adapted to be controlled by said member, so that said conveyor remains inoperative when there is no package below the outlet of said storage funnel, and an electro-magnetic coupling for throwing into engagement the driving wheel for said measuring conveyor, the connecting contacts of said coupling being open when said closing means is locked, but are closed when the closing means is opened, and a contact roller on the operating rod of said closing means adapted to open and close said connecting contacts.

16. In a measuring device with conveyor dosing mechanism for filling and the like machines, in combination, a storage funnel, closing means for the storage funnel, means for operating said closing means, a conveyor means for driving said conveyor means, and a member adapted to be yieldingly reciprocated towards the filling station, and a clutch located between the driving shaft and the driving means for said conveyor means adapted to be controlled by said member, so that said conveyor remains inoperative when there is no package below the outlet of said storage funnel, and an electro-magnetic coupling for throwing into engagement the driving wheel for said measuring conveyor, the connecting contacts of said coupling being open when said closing means is locked, but are closed when the closing means is opened, and a contact roller on the operating rod of said closing means adapted to open and close said connecting contacts, and filling means for the packages, comprising a preliminary dosing conveyor and a final dosing conveyor combined with a weighing device.

17. In a measuring device with conveyor dosing mechanism for filling and the like machines, in combination, a storage funnel, closing means for the storage funnel, means for operating said closing means, a conveyor means for driving said conveyor means, and a member adapted to be yieldingly reciprocated towards the filling station, and a clutch located between the driving shaft and the driving means for said conveyor means adapted to be controlled by said member, so that said conveyor remains inoperative when there is no package below the outlet of said storage funnel, and an electro-magnetic coupling for throwing into engagement the driving wheel for said measuring conveyor, the connecting contacts of said coupling being open when said closing means is locked, but are closed when the closing means is opened, and a contact roller on the operating rod of said closing means adapted to open and close said connecting contacts, and filling means for the packages, comprising a preliminary dosing conveyor and a final dosing conveyor combined with a weighing device, the control of the measuring conveyor and the closing means of the preliminary dosing device being effected by said member mechanically and of the final dosing from the member electrically.

18. In a measuring device with conveyor dosing mechanism for filling and the like machines, in combination, a storage funnel, closing means for the storage funnel, means for operating said closing means, a conveyor means for driving said conveyor means, and a member adapted to be yieldingly reciprocated towards the filling station, and a clutch located between the driving shaft and the driving means for said conveyor means adapted to be controlled by said member, so that said conveyor remains inoperative when there is no package below the outlet of said storage funnel, and an electro-magnetic coupling for throwing into engagement the driving wheel for said measuring conveyor, the connecting contacts of said coupling being open when said closing means is locked, but are closed when the closing means is opened, and a contact roller on the operating rod of said closing means adapted to open and close said connecting contacts, and filling means for the packages, comprising a preliminary dosing conveyor and a final dosing conveyor combined with a weighing device, the control of the measuring conveyor and the closing means of the preliminary dosing device being effected by said member mechanically and of the final dosing from the member electrically, and a contact device connected in the circuit of the controlling device for the measuring conveyor of the final dosing device controlled by the balance beam of the weighing device, in such a manner that this contacting device is kept closed until the weighing of the package has been completed, whereby the contacts are opened and the circuit broken.

19. In a measuring device with conveyor dosing mechanism for filling and the like machines, in combination, a storage funnel, closing means for the storage funnel, means for operating said closing means, a conveyor means for driving said conveyor means, and a member adapted to be yieldingly reciprocated towards the filling station, and a clutch located between the driving shaft and the driving means for said conveyor means adapted to be controlled by said member, so that said conveyor remains inoperative when there is no package below the outlet of said storage funnel, and an electro-magnetic coupling for throwing into engagement the driving wheel for said measuring conveyor, the connecting contacts of said coupling being open when said closing means is locked, but are closed when the closing means is opened, and a contact roller on the operating rod of said closing means adapted to open and close said connecting contacts, and filling means for the packages, comprising a preliminary dosing conveyor and a final dosing conveyor combined with a weighing device, the control of the measuring conveyor and the closing means of the preliminary dosing device being effected by said member mechanically and of the final dosing from the member electrically, and a contact device connected in the circuit of the controlling device for the measuring conveyor of the final dosing device controlled by the balance beam of the weighing device, in such a manner that this contacting device is kept closed until the weighing of the package has been completed, whereby the contacts are opened and the circuit broken, one contact of said contacting device consisting of a conductor movable with said balance beam, and the other of a stationary mercury cap.

20. In a measuring device with conveyor dosing mechanism for filling and the like machines, in combination, a storage funnel, closing means for the storage funnel, means for operating said closing means, a conveyor means for driving said conveyor means, and a member adapted to be yieldingly reciprocated towards the filling station, and a clutch located between the driving shaft and the driving means for said conveyor means adapted to be controlled by said member, so that said conveyor remains inoperative when there is no package below the outlet of said storage funnel, and an electro-magnetic coupling for throwing into engagement the driving wheel for said measuring conveyor, the connecting contacts of said coupling being open when said closing means is locked, but are closed when the closing means is opened, and a contact roller on the operating rod of said closing means adapted to open and close said connecting contacts, and filling means for the packages, comprising a preliminary closing conveyor and a final dosing conveyor combined with a weighing device, the control of the measuring conveyor and the closing means of the preliminary dosing device being effected by said member mechanically and of the final dosing from the member electrically, and a contact device connected in the circuit of the controlling device for the measuring conveyor of the final dosing device controlled by the balance beam of the weighing device, in such a manner that this contacting device is kept closed until the weighing of the package has been completed, whereby the contacts are opened and the circuit broken, one contact of said contacting device consisting of a conductor movable with said balance beam, and the other of a stationary mercury cap, the movable contact consisting of a U-shaped wire mounted on the rigging of the scales in an insulating member, which up to the final weighing out of the package remains with its free ends immersed in stationary mercury cups.

In testimony whereof I have affixed my signature.

PAUL GANGLER.